Oct. 6, 1970

J. UPATNIEKS 3,532,407

SPATIAL FREQUENCY REDUCTION IN HOLOGRAPHY

Filed Sept. 12, 1967

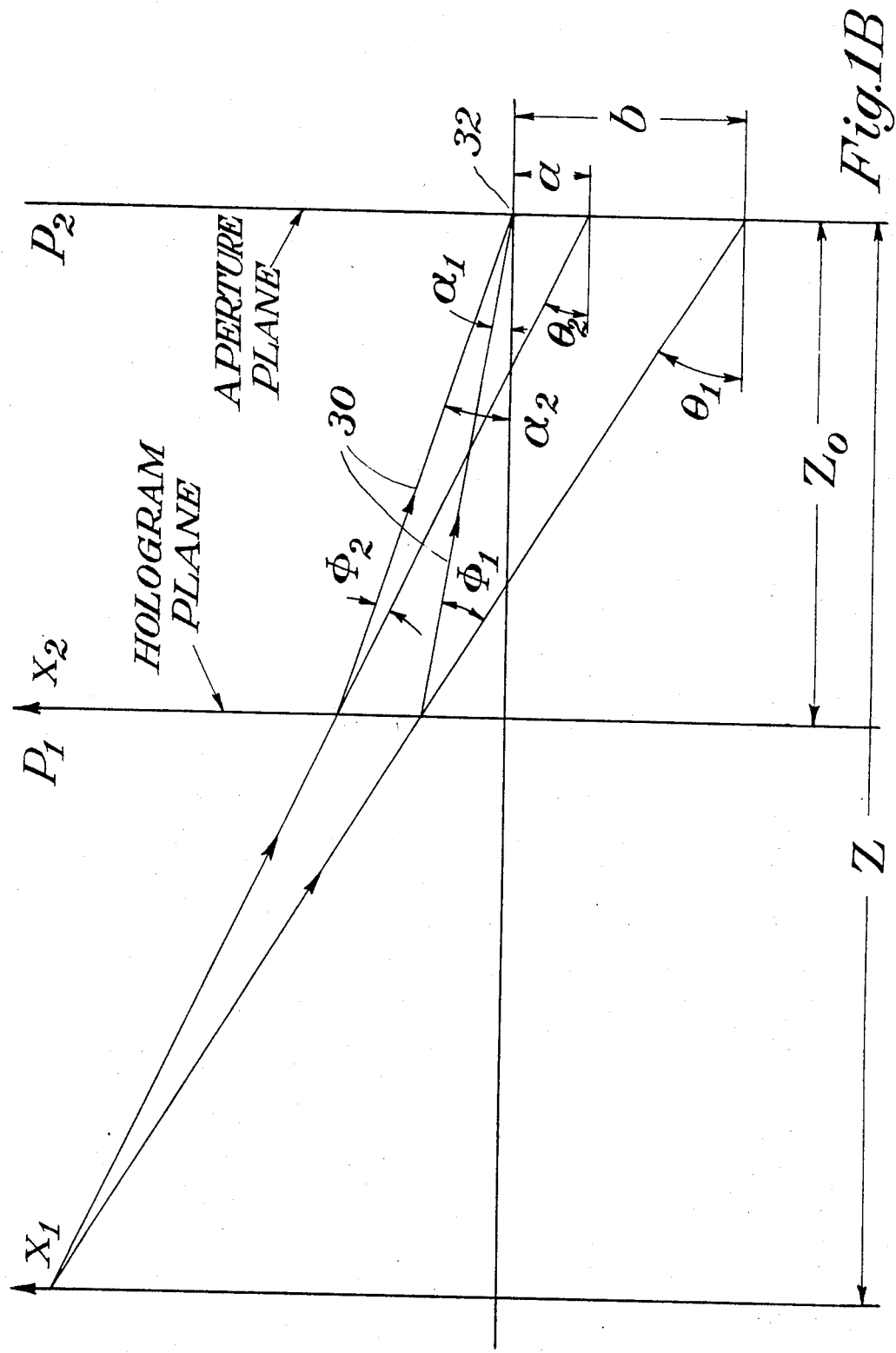

RECONSTRUCTED
REAL IMAGE

APERTURE PLANE

REFERENCE BEAM

Oct. 6, 1970 J. UPATNIEKS 3,532,407
SPATIAL FREQUENCY REDUCTION IN HOLOGRAPHY
Filed Sept. 12, 1967 6 Sheets-Sheet 6

United States Patent Office 3,532,407
Patented Oct. 6, 1970

3,532,407
SPATIAL FREQUENCY REDUCTION IN HOLOGRAPHY
Juris Upatnieks, Ann Arbor, Mich., assignor, by mesne assignments, to The Battelle Development Corporation, Columbus, Ohio, a corporation of Delaware
Continuation-in-part of application Ser. No. 644,226, June 7, 1967. This application Sept. 12, 1967, Ser. No. 667,302
Int. Cl. G02b 27/22
U.S. Cl. 350—3.5    10 Claims

ABSTRACT OF THE DISCLOSURE

A method of making holograms with a reduced spatial frequency by spatially filtering, with a small apertured filter, all but those rays of the object beam which will result in relatively low spatial frequencies recorded at the hologram plane. The filtered object beam is combined with a reference beam coherent therewith to produce a hologram in the normal off-axis technique. The reference beam is directed to the hologram at a small angle with respect to the unfiltered rays of the object beam as determined by positioning the apparent point source of the reference beam close to the effective aperture of the filter.

RELATED APPLICATIONS

This application is a continuation-in-part of co-pending application Ser. No. 644,226, filed June 7, 1967, and now abandoned.

BACKGROUND OF THE INVENTION

Field of the invention

This invention resides in the field of holography and is specifically directed to a method and a means for producing holograms with a reduced spatial frequency.

Brief description of the prior art

A conventional off-axis hologram is the recorded wavefront pattern emanating from an object and is produced by causing interference between an object beam coming from the object and a reference beam coherent with the object beam directed to a hologram detector at an angle or "off-axis." When the object beam is removed and only the reference beam or its conjugate is directed to the hologram, real and virtual images of the original object are reconstructed and are carried in the two first order diffracted beams respectively. In the construction of the hologram, the spatial frequency of the wavefront depends upon the wavelength of the radiation utilized and the angle between the object beam and the reference beam. In the construction of a very simple hologram in which the object beam is a plane wave incident at right angles to the hologram plane and the reference beam is a plane wave incident at an angle $\theta$ with the normal to the hologram plane, the intensity pattern at the hologram detector will be a simple grating with a spatial frequency equal to $\sin \theta/\lambda$. For a typical hologram, $\sin \theta$ might be of the order of 0.5 and $\lambda$ equal to $0.5 \times 10^{-3}$ mm. so that the spatial frequency is of the order of 1000 lines per mm. When holograms of three-dimensional objects are made, for example, several spatial frequencies, some very high and some very low, are present at the hologram detector and all of these spatial frequencies are recorded on the hologram.

It is sometimes advantageous to produce holograms with a reduced spatial frequency; one obvious case would be in order to reduce the resolution requirement of the hologram detector placed at the hologram plane. The resolution capability of present day photographic emulsions has put severe restrictions on the holographic technique. Another instance in which a lower spatial frequency would be desirable is in a situation where holographic information is to be transmitted. In this case, the number of pieces of information recorded on the hologram and to be transmitted is determined by the spatial frequency times the dimensions of the hologram. For example, a hologram with a spatial frequency of 1000 lines/mm. in one direction and a spatial frequency of 500 lines/mm. in the other direction, and with dimensions of 300 mm. by 300 mm. would contain about $10^{10}$–$10^{11}$ pieces of information. It is, therefore, apparent that a hologram with a significantly reduced spatial frequency would greatly facilitate the transmission of its information content.

It is well known that spatial frequencies in an object beam wavefront can be separated by placing appropriate filters or masks in the frequency plane of an imaging system. The usual method is to insert a lens in the path of the object beam which focuses the light in a plane where it can be easily filtered. This system of displaying the spatial frequencies at the frequency plane of an imaging system and filtering or identifying the spatial frequencies is a widely used technique in character recognition, inspection, and in analysis systems.

The present invention describes a novel method for filtering the spatial frequencies from an object and is particularly useful in producing holograms of reduced spatial frequency.

It is, therefore, an object of this invention to produce holograms of reduced spatial frequency.

It is a more specific object of this invention to provide a means and a method for spatially filtering the object beam in the construction of a hologram so that the pattern recorded by the hologram is of a reduced spatial frequency.

Other objects and advantages of the invention will become apparent.

SUMMARY OF THE INVENTION

A hologram of reduced spatial frequency can be produced by placing a small apertured filter in the object beam, placing a hologram detector in the object beam at a position beyond the aperture, directing a reference beam to the hologram detector such that its apparent source position is very near the effective aperture, and recording the interference pattern between the object and the reference beams.

The subject matter regarded as the invention is particularly pointed out and distinctly described in the appended claims. However, the invention, both as to its mode of operation, together with further objects and advantages thereof, may best be understood with reference to the following description taken in connection with the accompanying drawings, in which:

BRIEF DESCRIPTION OF THE DRAWINGS

FIGS. 1A and 1B are redrawn portions of the embodiment of FIG. 1 which will be of aid in a detailed analysis of the invention;

DETAILED DESCRIPTION OF PREFERRED EMBODIMENTS

Figure 1:
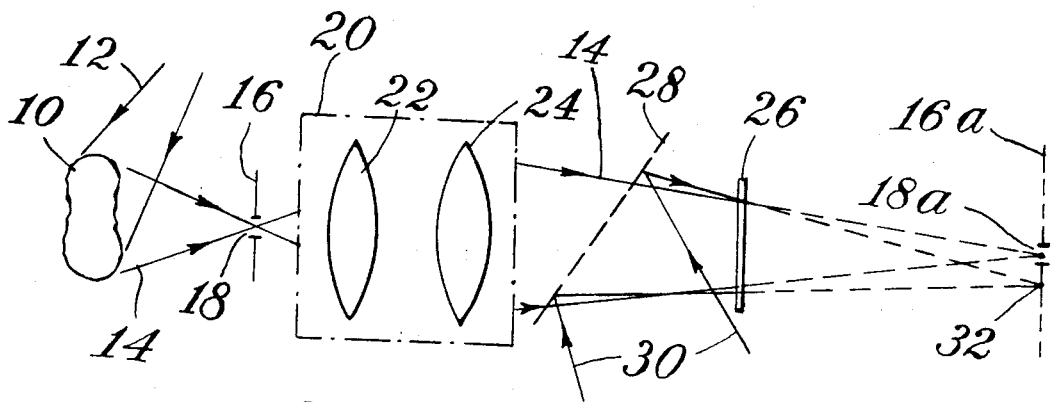
FIG. 1 depicts one embodiment of the method of making a hologram according to the present invention.

Referring to FIG. 1, there is shown one embodiment of the present invention in which an object 10 is illuminated with a beam of coherent radiation 12 emanating from a source (not shown) so as to reflect an object bearing wavefront 14. It should be noted that while the object 10 is shown to be an opaque object which reflects the object beam 14, an equally applicable situation would be one in which the object is transparent and the object beam is transmitted through the object. A spatial filter 16 with a small aperture 18 is positioned in the path of the object beam 14 to block all but those rays which will result in lower recorded spatial frequencies and an optical system 20 is utilized to produce images 16a and 18a of the filter and aperture respectively. A typical optical system (not shown to scale in FIG. 1) would include a pair of identical lenses 22 and 24 separated by a distance equal to twice their focal length or 2F in order to form a unit magnification system.

A hologram detector 26 is placed between the image plane and the optical system 20 to intercept the object beam 14. A beam splitter 28 is placed in front of the hologram detector 26 and a reference beam 30 is directed to the beam splitter so as to be reflected to the hologram detector to form the hologram. The beam splitter 28 and the reference beam 30 are so oriented that an apparent point source 32 of the reference beam lies very close to the image 18a of the aperture. By making the aperture 18 very small and by positioning the apparent point source 32 near the image 18a of the aperture, the angle between the object and the reference beam is reduced and the spatial frequencies recorded at the hologram plane can be made quite small.

Figure 1A:
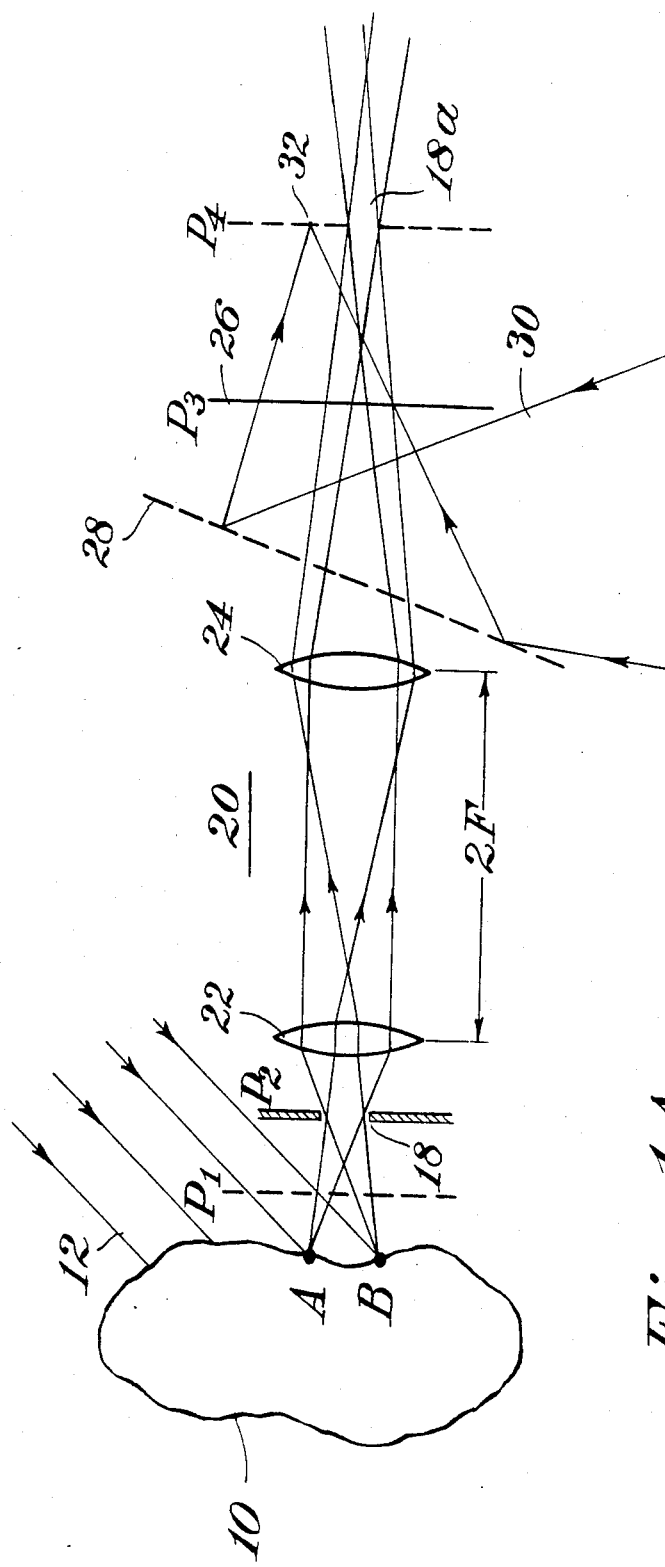

In order to understand the invention in a quantitative sense, it may be helpful to analyze the system in detail with the aid of FIGS. 1A and 1B. In FIG. 1A, a pair of rays emanating from the object are traced and in FIG. 1B, particular angles, distances, and dimensions of a portion of the system are indicated. In the course of the quantitative analysis to follow, a preferred spacing between the apparent point source of the reference beam and the image of the aperture is determined.

In FIG. 1A the object 10 is illuminated with coherent light 12 and light rays are reflected in all directions. The lens system 20, comprising lenses 22 and 24, images the object, and also it images the indicated planes $P_1$ and $P_2$ to planes $P_3$ and $P_4$, respectively. Plane $P_1$ is the image plane corresponding to the hologram which is positioned at plane $P_3$ and plane $P_2$ contains the aperture 18. The hologram positioned at plane $P_3$ records only those light rays which pass through the aperture 18 at plane $P_2$, and these are the same rays which will pass through the virtual image 18a of the aperture positioned at plane $P_4$. FIG. 1A shows light rays traced for two points, A and B, on the object. As described with respect to FIG. 1, a reference beam 30 is introduced to be reflected from a beam splitter 28 so that it comes to focus at point 32 close to the virtual image 18a of the aperture at plane $P_4$. In this manner the maximum angle between the reference beam and the object beam at the hologram 26 at plane $P_3$ will remain small even though the angle of view is large. The angle between the beams remains small because the direction of the reference beam approximates the direction of the light rays coming from the object scene. By making the aperture 18 smaller and by bringing the reference beam closer to it, or by increasing the separation between the planes $P_3$ and $P_4$, the spatial frequencies recorded by the hologram 26 can be made as low as desired.

The highest spatial frequency present in an ordinary hologram is determined by the largest angle between the object and the reference beams. This maximum frequency is given by the relation $$f_{max} = \left(2 \sin \frac{\phi}{2}\right) / \lambda$$

where $\lambda$ is the wavelength of the light and $\phi$ is the maximum angle between the reference and the object beams. With the aid of FIG. 1B the maximum and minimum spatial frequencies will be calculated for the hologram made in accordance with FIG. 1A. In FIG. 1B the object, the virtual image of the hologram at plane $P_1$, and the aperture plane $P_2$ are redrawn on an enlarged scale. Point $x_1$ is a point on the object which is positioned at a distance $z$ from plane $P_2$, the latter of which is positioned at a distance $z_0$ from the plane $P_1$. The size of the aperture in plane $P_2$ is $(b-a)$ and is spaced at a distance $a$ from the point 32 which is the focus of the reference beam 30. We want to find the angles $\phi_1$ and $\phi_2$ since these are the maximum and minimum angles between the reference and object beams and which therefore determine the maximum and minimum spatial frequencies recorded at the hologram plane. We will do this by finding the angles $\alpha_1$, $\alpha_2$, $\theta_1$, $\theta_2$ from the geometry; and then using these angles we can calculate the angles $\theta_1$ and $\theta_2$.

The following relationship exist:

$$\alpha_1 = \tan^{-1}[(x_1+b)/z - b/z_0] \quad (1)$$
$$\alpha_2 = \tan^{-1}[(x_1+a)/z - a/z_0] \quad (2)$$
$$\theta_1 = \tan^{-1}[(x_1+b)/z] \quad (3)$$
$$\theta_2 = \tan^{-1}[(x_1+a)/z] \quad (4)$$
$$\phi_1 = \theta_1 - \alpha_1 \quad (5)$$
$$\phi_2 = \theta_2 - \alpha_2 \quad (6)$$

The spatial frequencies are then given by:

$$f_{min} = (2/\lambda) \sin(\phi_2/2) \quad (7)$$
$$f_{max} = (2/\lambda) \sin(\phi_1/2) \quad (8)$$

By using small angle approximations we get:

$$\phi_1 \approx b/z_0 \quad (9)$$
$$\phi_2 \approx a/z_0 \quad (10)$$

and for the spatial frequencies:

$$f_{min} \approx a/(z_0 \lambda) \quad (11)$$
$$f_{max} \approx b/(z_0 \lambda) \quad (12)$$

When first order images are to be reconstructed from the hologram it is preferable that the first order diffracted beams, which carry the images of interest, should be separated from the intermodulation term as well as the zero order or D.C. term. In order to do this, the condition:

$$f_{max} - f_{min} \leq f_{min} \quad (13)$$

must be satisfied, which in turn means that:

$$(b-a) \leq a \quad (14)$$

In other words, the preferable minimum spacing between the focus point 32 of the reference beam and the aperture or image of the aperture 18a should be greater than the size of the aperture itself.

Equations 11 and 12 clearly show that the maximum spatial frequency can be made arbitrarily low if the hologram is moved further from the aperture; that is, $z_0$ is increased. The spatial frequency may also be reduced if one is willing to decrease the size, $(b-a)$, of the aperture.

As an example, let us compare the spatial frequency requirements for two holograms in which the total number of resolution elements is the same and in which the size of the viewing aperture is the same. In the first case this is a conventional off-axis hologram wherein the hologram size which defines the viewing aperture is 10 mm. square. Assume that the field of view as 14°, and that the wavelength, λ, is $5 \times 10^{-4}$ mm.

The maximum spatial frequency of the object is $$[2/(5 \times 10^{-4})] \sin (14°/2) = 500 \ 1/\text{mm}.$$

By choosing a reference beam at an angle so that we have twice the maximum object beam frequency, we need a recording medium with a resolution of 1,000 lines/mm.

In the second case, by utilizing the techniques of this invention we can record exactly the same information by letting $z_0 = 400$ mm. and by using a hologram 100 mm. square; that is, a hologram size that is significantly larger than that used in the first case. In order to maintain the same viewing aperture, the value $(b-a)$ must be equal to 10 mm. so that $b = 20$ and $a = 10$ mm. The maximum spatial frequency of the object beam in this case is 50 lines/mm., and with the carrier, the maximum spatial frequency as calculated from equation (12) would be $$(b/z_0 \lambda) = \left(\frac{20}{400}\right)\left(\frac{1}{5 \times 10^{-4}}\right) = 100 \text{ lines/mm}.$$

Thus, the spatial frequency is reduced by a factor of 10, while the total information and viewing aperture remains the same in both cases.

Figure 2:
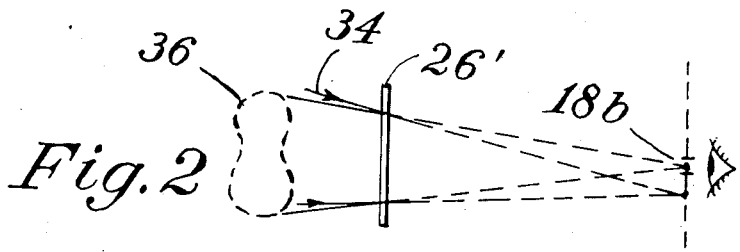
FIG. 2 depicts the reconstructing of a hologram made in accordance with FIG. 1.

The hologram 26' made in accordance with FIG. 1 may be reconstructed in a conventional manner, as shown in FIG. 2, wherein an illuminating beam 34 is directed to the hologram 26' at the same angle as the reference beam 30 took during the construction process. The illuminating beam should be monochromatic and spatially coherent; an example of which would be a beam from a mercury arc point source or a laser. A virtual image 36 of the object 10 is carried in one of the first order diffracted beams and may be viewed through a viewing aperture 18b which is an image of the aperture 18. The viewing aperture 18b is located at the same position (plane $P_3$) relative to the hologram, as was the image 18a of the aperture 18 in the construction process shown in FIG. 1.

Although the hologram 26' is of reduced spatial frequency, it will be apparent that in order to achieve such reduced frequencies, the change in perspective has been reduced. On the other hand, since all of the diffracted light is directed through the small viewing aperture 18b, the intensity of the image 36 of the object 10 as seen by the observer may be increased by several orders of magnitude over ordinary holograms.

Since the percentage of incident light that can be diffracted into one side order is constant, the brightness of the image is inversely proportional to the area over which the light is diffracted. If we now take our 100 mm. square hologram but without the utilization of the technique according to this invention, the light would be diffracted over an area of 100 mm. square. A hologram made according to this invention with a 10 mm. square aperture would be brighter by a ratio of $(100/10)^2 = 100$. The utilization of an aperture will decrease the total object beam intensity by approximately the same factor so the exposure time in making the hologram will have to be increased by a similar factor. This does not present a serious problem in most cases, since a lower resolution film, having a much faster speed, may be utilized.

Figure 3:
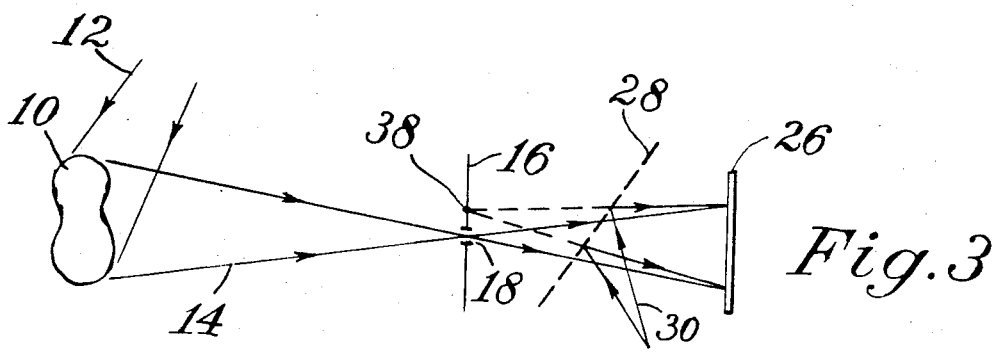
FIG. 3 illustrates another embodiment of making a hologram according to this invention.

Another way to produce a hologram of reduced spatial frequency, as illustrated in FIG. 3, is to introduce the reference beam 30 such that its apparent point source position 38 lies in the plane of the spatial filter 16 and very close to the aperture 18. As in FIG. 1, the method illustrated in FIG. 3 reduces the angle between the object and the reference beam, which, coupled with the utilization of the spatial filter 16, reduces the spatial frequencies recorded at the hologram plane. In other respects the embodiment illustrated in FIG. 3 is the same as that in FIG. 1 and, therefore, ilke elements are given like reference numerals.

Figure 4:
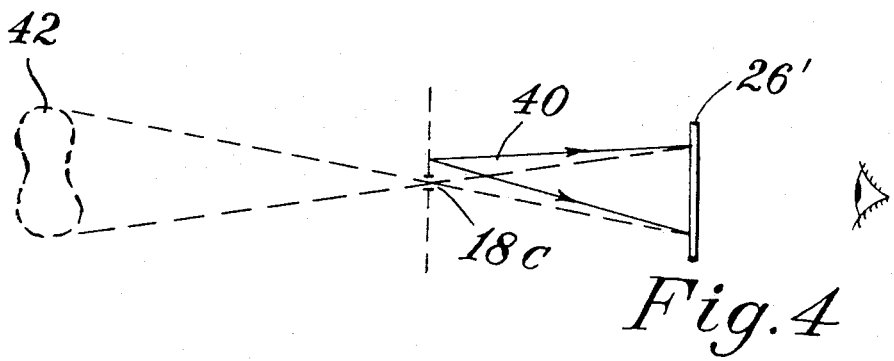
FIG. 4 illustrates one method of reconstructing from the hologram made in accordance with FIG. 3.

Reconstruction from a hologram made in accordance with FIG. 3, illustrated in FIG. 4, includes a monochromatic spatially coherent illuminating beam 40 directed to the hologram at the same angle that the reference beam took in the construction process of FIG. 3. In this case, however, a virtual image 18c of the aperture 18 is formed and lies between the observer and the virtual image 42 of the object 10. Thus, in viewing this image, the field of view is limited by the aperture 18c and the observer will see only a small part of the object at any one time.

This drawback can be cured in another embodiment of this invention in which a two-step procedure is utilized in the hologram construction process. The first step is a construction of a first hologram in accordance with the procedure in FIG. 3 and the second step is the construction of a second hologram in accordance with FIG. 5, to be described.

Figure 5:
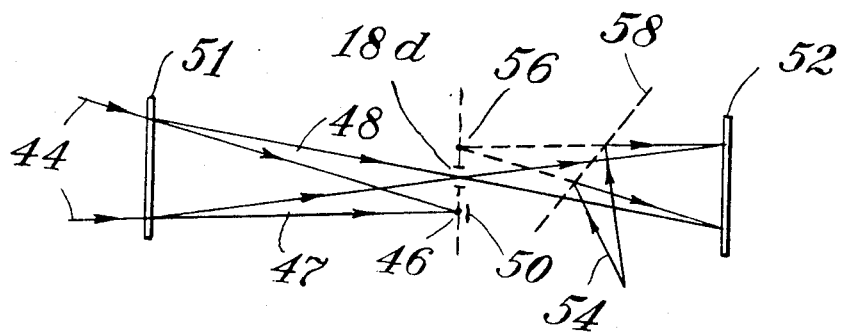
FIG. 5 illustrates the second step of a two-step method of constructing holograms in accordance with this invention.

Referring to FIG. 5, a hologram 51, made in accordance with FIG. 3 is reconstructed with a beam 44 of coherent radiation. The reconstruction beam 44 has a waveform that is the complex conjugate of the reference beam 30 in FIG. 3. For a spherical wave, the complex conjugate waveform has a divergence which is the opposite of the original waveform; that is, the reconstruction beam 44 converges to the same degree that the reference beam 30 in FIG. 3 diverges.

In reconstructing the hologram 51 in this manner, a first order diffracted beam 48 carries the real image of the object as recorded by the hologram detector in FIG. 3. The zero order or undiffracted beam 47 may be blocked by an appropriate filter stop 50 placed at the apparent point source position 46 of the reconstruction beam 44.

In accordance with the embodiment of the invention now being described, a second hologram detecting surface 52 is positioned in the path of the diffracted beam 48. The beam 48 serves as an object bearing wavefront and a second hologram is produced by introducing a reference beam 54 whose apparent point source 56 lies in the plane of and very near the reconstructed image 18d of the aperture 18. A beam splitter 58 reflects the reference beam 54 to the hologram detector 52.

Figure 6:
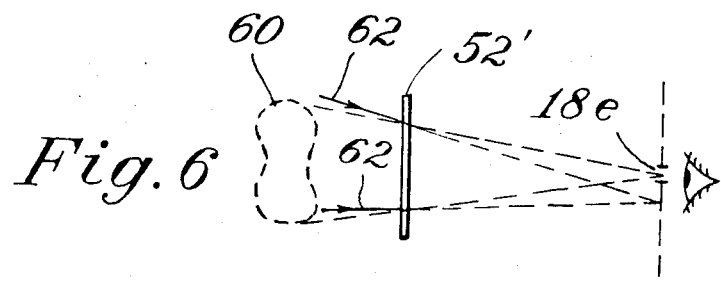
FIG. 6 illustrates a preferred method of reconstructing images from the hologram made in FIG. 5.

The second hologram 52' can now be used to reconstruct an image 60 of the object as illustrated in FIG. 6. In FIG. 6, the hologram 52' is reconstructed with a monochromatic spatially coherent illuminating beam 62, that is complex conjugate of beam 54, and which is directed at the same angle that the reference beam 54 took during the construction of the second hologram 52 in FIG. 5. A virtual image 60 of the original object may be viewed by positioning the eye in the viewing aperture formed by the reconstructed image 18e of the aperture image 18d. The viewing aperture 18e is located in a plane which is spaced a corresponding distance from the hologram 52', as was the image 18d from the hologram 52 in FIG. 5. It will be apparent that the reconstruction method of FIG. 6 is identical to that of FIG. 2. Furthermore, it should be noted that the method of FIG. 5 may be very similar to that of FIG. 1, one difference being that in place of the optical system 20 of FIG. 1, in which a pair of lenses 22 and 24 are utilized, the method of FIG. 5 replaces such an optical system with a first hologram 51, similar to the hologram 26 made in accordance with FIG. 3.

In the two-step method now being described, it will be noted that the illuminating beam 62 in FIG. 6 is shown with an opposite curvature to the reference beam 54 utilized in the construction of the second hologram 52 in FIG. 5. The reason for this is that in the construction of the second hologram 52, the object beam comprises a first order diffracted beam emanating from the hologram 51 and which carries the complex conjugate wavefront of the original object. Therefore, in order to reconstruct the original object wavefront from the hologram 52′, the complex conjugate of the reference beam 54 must be utilized.

Figure 7:
FIG. 7 shows an alternative arrangement to the method of FIG. 5.
Figure 7:
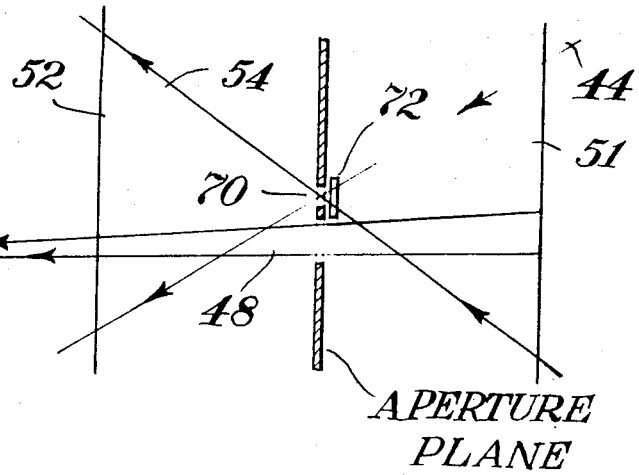

FIG. 7 illustrates an alternative arrangement of the two-step method described with respect to FIG. 5 in which the illuminating beam 44 for the first hologram 51 becomes the reference beam 54 for the production of the second hologram 52. In this embodiment a pin-hole 70 and an attenuator 72, such as a polarizing plate or an absorption filter, are used to obtain a clean reference beam and the proper object signal to reference signal ratio.

Figure 8:
FIGS. 8 and 9 show another alternative embodiment of the present invention.
Figure 8:
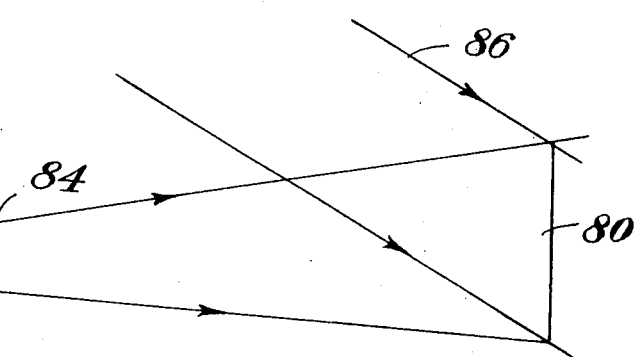
Figure 9:
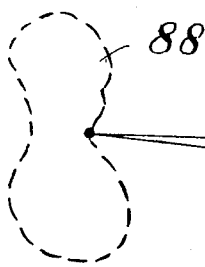
Figure 9:
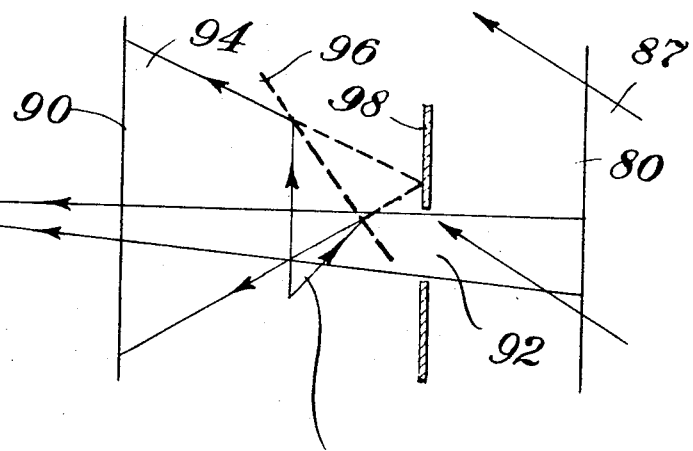

It should be pointed out that the present invention is also useful in producing holograms of reduced spatial frequencies from other holograms made in a conventional technique. Thus in FIG. 8 a hologram 80 of an object 82 is produced by the interaction of an object beam 84 and a coherent reference beam 86. It will be recognized that this is the ordinary off-axis technique of making holograms as described in patent application Ser. No. 361,977, filed April 23, 1964 by Leith and Upatnieks issued April 14, 1970 as U.S. Pat. No. 3,506,327. In FIG. 9, a reconstructed real image 88 is produced by directing an illuminating beam 87, which is the conjugate of the reference beam 86, to the hologram 80 and a second hologram 90 is produced by a method similar to that previously described. Thus an aperture 92 is positioned in the real image bearing wavefront and a reference beam 94 is introduced by means of a beam splitter 96 such that its apparent source position 98 lies very near the aperture 92.

The above techniques have the advantage of reducing the spatial frequencies in holograms. The total amount of information recorded by the hologram need not be changed if the information is distributed over a larger area thereby resulting in a reduction of the information density. Holograms made according to this technique have several useful characteristics over and above the advantages of the reduction of spatial frequencies.

Reconstructed images from holograms made according to this technique are brighter than those from ordinary large holograms for the reason, as mentioned above, that all of the light diffracted by the hologram is concentrated in the small aperture. A similar increase in brightness would be achieved if a hologram of the same size as the aperture were illuminated by a laser source, thereby concentering all of the illuminating light in the aperture. In the case of a non-laser source, a different situation exists, since in this case the light is radiated over some solid angle and cannot be concentrated in a small area without increasing the apparent size of the source.

Non-laser sources of light are often used to reconstruct holograms. These lights may consist of an arc light, such as mercury, zirconium, or cadmium, or the ordinary tungsten filament lamps, such as are used in slide projectors and other conventional optical equipment. These lights are finite in size and polychromatic. Thus in order for them to be utilized for hologram reconstruction, an aperture must be used in order to provide sufficient spatial coherence and some sort of filter must be used to provide a monochromatic source. Failure to meet the criteria of spatial coherence and monochromaticity reduces the resolution of the image so that the image appears blurred to the viewer.

Therefore, for any given non-laser source with its finite source size, the source position or its image must be sufficiently far from the hologram that the spatial coherence requirement is met. As an example, if a mercury arc lamp with a ⅛″ diameter arc size is used to illuminate a hologam, the hologram must be placed at least one foot from the source so that the image resolution is not significantly reduced when viewed by the unaided eye. Thus, with a given source, the fraction of the total light that can be utilized by the hologram is limited by the size of the hologram and the minimum distance between the source and hologram. By using the methods of this invention, the image brightness will be greatly increased when using a non-laser source for reconstruction, since the hologram produced will utilize a larger fraction of the total light.

Figure 10A:
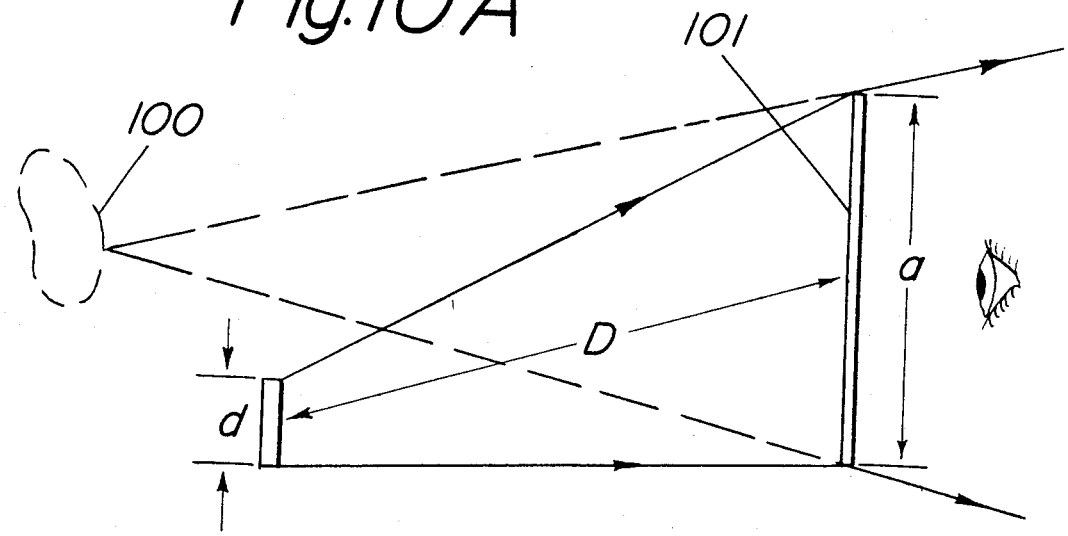
FIGS. 10A and 10B illustrate another advantage of the present invention.
Figure 10B:
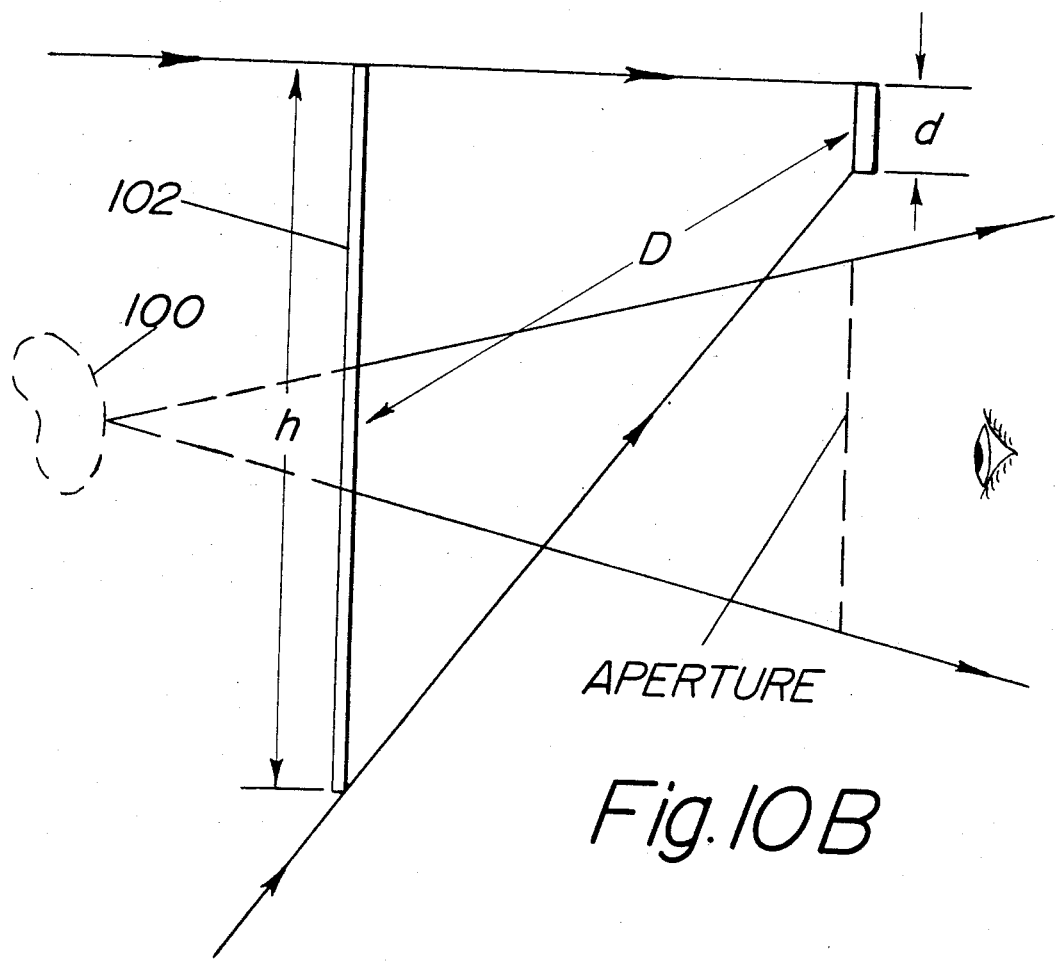

This can be seen by comparison of the diagram shown in FIGS. 10A and 10B. FIG. 10A shows a conventional hologram with a viewing aperture $a$ being reconstructed with a non-laser light. The light has a source size of $d$ and must be placed at a distance D from the hologram in order to meet the spatial coherence requirement. The image of the object 100 is then viewed through the hologram 101 which in this case is of a dimension, $a$ and defines the viewing aperture. FIG. 10B shows a hologram, which was constructed by one of the several methods described above (FIG. 1, FIGS. 3–5, FIG. 7, or FIGS. 8 and 9), being reconstructed by the same non-laser source as in FIG. 10A. That is, the source, or in this case, its image, must be positioned at a distance, D, from the hologram to provide the necessary spatial coherence. In this case, the hologram 102 has a dimension $h$ that is significantly larger than the hologram in FIG. 10A, and hence the amount of light utilized in the reconstruction is increased. If the two holograms in FIGS. 10A and 10B are square, the image brightness in the reconstruction shown in FIG. 10B are increased by about $(h/a)^2$.

Another advantage of having large holograms and con-concentrating all of the illuminating light in a small aperture is the improvement in signal-to-noise ratio. Light scattered due to noise from any film or point may be considered to be a constant fraction of the incident light, just as is the light diffracted into definite side orders. With a large hologram made according to the technique of this invention, all of the diffracted light is concentrated in a small aperture while the scattered noise is dispersed over a large area. The improvement in signal-to-noise ratio should be the same as the increase in brightness of the reconstructed image.

Although the invention has been described in various specific embodiments, the principles underlying the invention will suggest many modifications of these embodiments to those skilled in the art. Therefore, it is desired that the appended claims not be limited to the described embodiments, but rather should cover all such modifications as fall within the spirit and scope of the appended claims.

While the described embodiments have all included a beam splitter to introduce the reference beam such that the apparent point source position of the reference beam lies near the aperture or near the image of the aperture, it should be understood that this means is only preferred and that any means of so positioning the reference beam would be applicable. For example, it may be possible in some applications to position the actual point source near the aperture or image of the aperture rather than the apparent point source and eliminate the beam splitter. The "apparent source" position of the reference beam may refer to the position of an actual point source or may refer to the location of an image of an actual point source. Thus, in the claims, the term "apparent source," where used, should be taken to mean either the actual position of the point source or the point where the source appears to be.

Additionally, it has been seen that the invention includes positioning the apparent point source of the reference beam near either the aperture itself or an image of the aperture. Thus, in the claims, the term "effective aperture," where used, will be understood to mean either of these situations.

What is claimed is:

1. A method of constructing a hologram, comprising the steps of:
    illuminating an object with coherent radiation in a manner to produce an object-modified beam,
    positioning in the path of the object-modified beam a hologram detecting surface of a defined size, inserting between the object and the hologram detecting surface a spatial filter comprising a mask having an aperture of a size significantly smaller than the hologram detecting surface size, thereby to limit the range of spatial frequencies of the object-modified beam that intersect said detecting surface, directing onto the hologram detecting surface for interference at a finite angle with the object-modified beam of limited spatial frequencies a reference beam coherent with the object illuminating beam and having an apparent point source position adjacent to the effective aperture of the mask and displaced from said aperture a distance no greater than the aperture size, whereby an interference pattern of low spatial frequencies is formed at the hologram detecting surface, and recording the interference pattern produced at said hologram detecting surface, thereby producing a hologram.

2. The method as defined in claim 1 wherein the step of directing the reference beam comprises inserting a beam splitter in the path of said modified beam and directing a reference beam to said beam splitter such that at least a portion thereof is reflected toward said hologram detecting surface.

3. The method as defined in claim 1 which comprises the additional step of imaging said spatial filter into a surface located behind said hologram detecting surface, and additionally wherein the reference beam has a curvature such that its apparent point source position is adjacent to the image of the aperture of the spatial filter.

4. The method as defined in claim 1 wherein the reference beam has a curvature such that its apparent point source position is adjacent to the actual aperture of the spatial filter.

5. The method as defined in claim 1 and further including reconstructing an image of the object by illuminating the hologram with a monochromatic spatially coherent illuminating beam directed against the hologram at an angle therewith that is substantially the same as the angle between the reference beam and the hologram detecting surface during construction of said hologram.

6. The method as defined in claim 1 wherein the hologram detecting surface is planar and wherein the apparent point source position of the reference beam lies in a plane of the spatial filter that is substantially parallel with the hologram detecting surface and is displaced from the effective aperture of the spatial filter a distance equal to the size of the effective aperture.

7. The method according to claim 4, comprising the additional steps of:

illuminating said hologram with a radiation beam that is the complex conjugate of the reference beam, thereby producing a diffracted beam in which a real image of the spatial filter and aperture is formed, positioning in the path of said real image carrying diffracted beam a second hologram detecting surface, directing onto the second hologram detecting surface for interference with the real image carrying diffracted beam a second reference beam coherent with the hologram illuminating beam and having an apparent point source position adjacent to the reconstructed real image of the aperture of the spatial filter, and recording an interference pattern produced at said second hologram detecting surface, thereby producing a second hologram.

8. The method as defined in claim 7 and further including reconstructing an image of the object by illuminating the second hologram with a monochromatic spatially coherent illuminating beam that is substantially a complex conjugate of said second reference beam.

9. The method as defined in claim 8 wherein in the production of said second hologram said second reference beam is derived from said hologram illuminating beam.

10. The method as defined in claim 9 wherein an attenuating means is placed in the path of said second reference beam derived from said hologram illuminating beam in order to conform the order of magnitude of the intensity of said second reference beam to that of the real image carrying diffracted beam from said hologram.

References Cited

UNITED STATES PATENTS

| | | | |
|---|---|---|---|
| 2,770,166 | 11/1956 | Gabor | 350—3.5 |
| 3,370,268 | 2/1968 | Dobrin et al. | 350—162 XR |

OTHER REFERENCES

Laser Focus, vol. 2, No. 11, June 1, 1966, p. 7.

Haines et al., Proceedings of the IEEE, vol. 55, No. 8, August 1967, pp. 1512–1513.

DAVID SCHONBERG, Primary Examiner

R. J. STERN, Assistant Examiner

U.S. Cl. X.R.

350—162